(12) United States Patent
Goldstein et al.

(10) Patent No.: US 10,241,309 B2
(45) Date of Patent: Mar. 26, 2019

(54) FORWARD THROW ASYMMETRIC OPTIC DESIGN

(71) Applicant: PHILIPS LIGHTING HOLDING B.V., Eindhoven (NL)

(72) Inventors: Peter Isaac Goldstein, Medford, MA (US); Eric Anthony Roth, Tyngsboro, MA (US); Oliver Dross, Eindhoven (NL); Benjamin Daniel Sweet-Block, Arlington, MA (US)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 15/566,276

(22) PCT Filed: Apr. 6, 2016

(86) PCT No.: PCT/EP2016/057483
§ 371 (c)(1),
(2) Date: Oct. 13, 2017

(87) PCT Pub. No.: WO2016/165987
PCT Pub. Date: Oct. 20, 2016

(65) Prior Publication Data
US 2018/0106990 A1    Apr. 19, 2018

Related U.S. Application Data

(60) Provisional application No. 62/147,013, filed on Apr. 14, 2015.

(51) Int. Cl.
*F21V 3/00* (2015.01)
*F21V 5/00* (2018.01)
*G02B 19/00* (2006.01)
*F21V 3/04* (2018.01)
*F21V 5/04* (2006.01)

(52) U.S. Cl.
CPC .......... *G02B 19/0066* (2013.01); *F21V 3/049* (2013.01); *F21V 5/04* (2013.01); *G02B 19/0028* (2013.01); *G02B 19/0061* (2013.01)

(58) Field of Classification Search
CPC . F21V 3/04–3/0625; F21V 5/00–5/048; G02B 19/0028; G02B 19/0047–19/0071
USPC ........................................ 362/249.02, 311.02
See application file for complete search history.

(56) References Cited

U.S. PATENT DOCUMENTS

2013/0223072 A1    8/2013 Castillo

FOREIGN PATENT DOCUMENTS

| DE | 202013011143 U1 | 4/2014 |
|----|----|----|
| EP | 2876362 A1 | 5/2015 |
| KR | 101343563 B1 | 12/2013 |

*Primary Examiner* — Jason M Han

(57) ABSTRACT

A lighting unit (10) configured to illuminate a surface (32) having a proximal portion (34) and a distal portion (36) in relation to the lighting unit. The lighting unit includes a light source (12) configured to emit a light beam (28), and an optic (40) positioned between the light source and the surface to modify the emitted light beam to have a largely uniform vertical illumination distribution along the surface. The input surface (39) of the optic faces the light source and has a convex lens portion (41) that directs a portion of the emitted light beam at the distal portion of the surface, and a concave lens portion (43) that directs a portion of the emitted light beam at the proximal portion of the surface.

15 Claims, 5 Drawing Sheets

FORWARD THROW ASYMMETRIC OPTIC DESIGN

CROSS-REFERENCE TO PRIOR APPLICATIONS

This application is the U.S. National Phase application under 35 U.S.C. § 371 of International Application No. PCT/EP2016/057483, filed on Apr. 6, 2016 which claims the benefit of U.S. Provisional Patent Application No. 62/147,013, filed on Apr. 14, 2015. These applications are hereby incorporated by reference herein.

FIELD OF THE INVENTION

The present disclosure is directed generally to an asymmetric optic that directs light in a controlled horizontal and vertical beam pattern to create uniform illuminance on a surface.

BACKGROUND

Proper illumination of vertical surfaces such as walls or other tall structures, and horizontal surfaces like walks and driveways, often requires novel lighting units and systems due to the close setback and wide spacing required. Indirect lighting units have been created to illuminate these surfaces from the setback, but units suffer from several drawbacks.

One example of an indirect lighting unit used to illuminate surfaces from a setback is the asymmetric reflector. The beam pattern created by the asymmetric reflector is intended to create a uniform illuminance on the surface by aiming the peak intensity of the beam at the furthest point to be illuminated. The remainder of the beam is utilized to fill in the target area. While these beam patterns can have high uniformity over small regions, they tend to result in spill light that extends beyond the target area. Indeed, many forward throw asymmetric fixtures have a relatively wide vertical beam angle, which results in large setback-to-throw ratios or in higher-contrast illuminance.

Existing lighting units have several other disadvantages. For example, the surface illuminated by a setback lighting unit is often brighter at the region proximal to the lighting unit and dimmer at the region distal to the lighting unit. Further, the light beam projected onto the surface is narrower at the region proximal to the lighting unit and wider at the region distal to the lighting unit, resulting in a 'V' pattern or scalloping effect on the surface. In order to prevent the 'V' pattern or scalloping effect on the surface, existing lighting systems may utilize multiple lighting units on opposing ends of the surface, or use multiple lighting units of different intensities where brighter lighting units are directed at the distal portion of the surface and weaker lighting units are directed to the proximal portion of the surface. However, multiple lighting units adds additional time and expense to a lighting system, and in many locations it is impractical or impossible to utilize multiple lighting units.

Accordingly, there is a need in the art for an improved indirect lighting unit that provides uniform illumination of a surface from a setback. For example, there is a need for narrower beam angles that provide smaller setback-to-throw ratios and higher uniformity.

SUMMARY OF THE INVENTION

The present disclosure is directed to inventive methods and apparatus for uniform illumination of a surface from a lighting unit positioned at a close setback. Various embodiments and implementations herein are directed to a lighting unit that includes an optic positioned between a light source and a surface to be illuminated. The optic modifies the light beam to control it in both the horizontal and vertical axes to produce a uniform illumination without excess spill. For example, in some embodiments, the lighting unit includes an optic with a concave lens portion that focuses part of the light beam at a distal portion of the surface, and convex lens portion that focuses part of the light beam at a proximal portion of the surface.

Generally, in one aspect, a lighting unit is configured to illuminate a surface having a proximal portion and a distal portion in relation to the lighting unit. The lighting unit includes: (i) a light source configured to emit a light beam; and (ii) an optic positioned between the light source and the surface, the optic configured to modify the emitted light beam to comprise a largely uniform illumination distribution along the surface, where the optic has an input surface facing the light source, the input surface having a convex lens portion configured to direct a portion of the emitted light beam at the distal portion of the surface, and a concave lens portion configured to direct a portion of the emitted light beam at the proximal portion of the surface.

According to an embodiment, the lighting unit includes a diffuser positioned between the optic and the surface. According to an embodiment, the diffuser is at least partially contoured around the optic.

According to an embodiment, the lighting unit includes a baffle positioned between the optic and the surface.

According to an embodiment, the light source is an LED-based light source.

According to an embodiment, the lighting unit includes a plurality of light sources.

According to an embodiment, the emitted light beam comprises a substantially uniform illumination distribution along the length of the surface.

According to another aspect, a lighting system is configured to illuminate a surface having a proximal portion and a distal portion in relation to the lighting system. The lighting system includes: (i) a light source configured to emit a light beam; (ii) an optic positioned between the light source and the surface, the optic configured to modify the emitted light beam to have a largely uniform illumination distribution along the surface, where the optic has an input surface facing the light source, the input surface comprising a convex lens portion configured to direct a portion of the emitted light beam at the distal portion of the surface, and a concave lens portion configured to direct a portion of the emitted light beam at the proximal portion of the surface; (iii) a diffuser positioned between the optic and the surface; and (iv) a baffle positioned between the optic and the surface.

According to an embodiment, the diffuser is at least partially contoured around the optic.

According to an embodiment, the light source is an LED-based light source. According to an embodiment, the lighting system includes a plurality of light sources.

According to an embodiment, the emitted light beam has a substantially uniform illumination distribution along the length of the surface.

According to an embodiment, the lighting system includes a cover lens. According to an embodiment, the baffle of the lighting system is a textured portion of the cover lens.

According to another aspect is a lighting system for illuminating a surface having a proximal portion and a distal portion in relation to the lighting system. The lighting system includes: (i) a plurality of LED-based light sources each configured to emit a light beam; (ii) an optic positioned between each of the light sources and the surface, each optic configured to modify the light beam emitted by the respective one of the plurality of light sources to comprise a largely uniform illumination distribution along the surface, where each optic has an input surface facing the light source and comprises a concave lens portion configured to direct a portion of the emitted light beam at the distal portion of the surface, and a convex lens portion configured to direct a portion of the emitted light beam at the proximal portion of the surface; (iii) a diffuser positioned between the optic and the surface, wherein the diffuser is at least partially contoured around the optic; and (iv) a baffle positioned between the optic and the surface.

As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below). It also should be appreciated that LEDs may be configured and/or controlled to generate radiation having various bandwidths (e.g., full widths at half maximum, or FWHM) for a given spectrum (e.g., narrow bandwidth, broad bandwidth), and a variety of dominant wavelengths within a given general color categorization.

For example, one implementation of an LED configured to generate essentially white light (e.g., a white LED) may include a number of dies which respectively emit different spectra of electroluminescence that, in combination, mix to form essentially white light. In another implementation, a white light LED may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

It should also be understood that the term LED does not limit the physical and/or electrical package type of an LED. For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white LEDs). In general, the term LED may refer to packaged LEDs, non-packaged LEDs, surface mount LEDs, chip-on-board LEDs, T-package mount LEDs, radial package LEDs, power package LEDs, LEDs including some type of encasement and/or optical element (e.g., a diffusing lens), etc.

The term "light source" should be understood to refer to any one or more of a variety of radiation sources, including, but not limited to, LED-based sources (including one or more LEDs as defined above), incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources, pyro-luminescent sources (e.g., flames), candle-luminescent sources (e.g., gas mantles, carbon arc radiation sources), photo-luminescent sources (e.g., gaseous discharge sources), cathode luminescent sources using electronic satiation, galvano-luminescent sources, crystallo-luminescent sources, pyro-luminescent sources, thermo-luminescent sources, triboluminescent sources, sonoluminescent sources, radioluminescent sources, and luminescent polymers.

A given light source may be configured to generate electromagnetic radiation within the visible spectrum, outside the visible spectrum, or a combination of both. Hence, the terms "light" and "radiation" are used interchangeably herein. Additionally, a light source may include as an integral component one or more filters (e.g., color filters), lenses, or other optical components. Also, it should be understood that light sources may be configured for a variety of applications, including, but not limited to, indication, display, and/or illumination. An "illumination source" is a light source that is particularly configured to generate radiation having a sufficient intensity to effectively illuminate an interior or exterior space. In this context, "sufficient intensity" refers to sufficient radiant power in the visible spectrum generated in the space or environment (the unit "lumens" often is employed to represent the total light output from a light source in all directions, in terms of radiant power or "luminous flux") to provide ambient illumination (i.e., light that may be perceived indirectly and that may be, for example, reflected off of one or more of a variety of intervening surfaces before being perceived in whole or in part).

The term "controller" is used herein generally to describe various apparatus relating to the operation of one or more light sources. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs). Due to the various types of "controllers", any one of which may be suitable for use in accordance with any aspects of the present invention, controllers will be described as being "configured, programmed and/or structured" to perform a stated function, thus encompassing all possible forms of "controller."

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers. In addition, the "program" or "computer code" is to be understood as being stored on a non-transitory, computer readable medium.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

These and other aspects of the invention will be apparent from and elucidated with reference to the embodiment(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION OF EMBODIMENTS

The present disclosure describes various embodiments of apparatus, systems, devices, and methods for illuminating a surface with an asymmetric optic. More generally, Applicants have recognized and appreciated that it would be beneficial to improve the control and quality of a horizontal and vertical beam pattern to create uniform illuminance on a surface. A particular goal of utilization of embodiments of the present disclosure is to be able to illuminate a surface from a lighting unit having a close setback to that surface.

In view of the foregoing, various embodiments and implementations are directed to a lighting unit with a light source and an optic positioned between the light source and the surface to be illuminated. The optic includes a convex lens portion that focuses a portion of the light at the distal portion of the surface, and concave lens portion that focuses a portion of light at the proximal portion of the surface. The optic thereby modifies the light beam emitted by the light source to result in a largely uniform illumination distribution along the surface.

Figure 1:
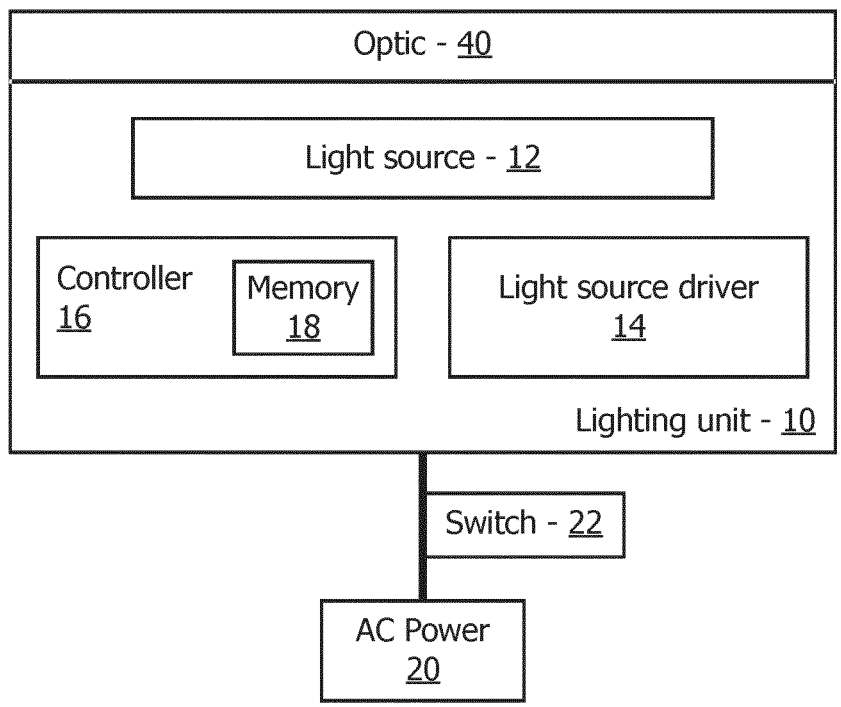
FIG. 1 is a schematic of a light source with an optic in accordance with an embodiment.

Referring to FIG. 1, in one embodiment, a lighting unit 10 is provided that includes one or more light sources 12, where one or more of the light sources may be an LED-based light source. Further, the LED-based light source may have one or more LEDs. The light source can be driven to emit light of predetermined character (e.g., color intensity, color temperature) by one or more light source drivers 14. Many different numbers and various types of light sources (all LED-based light sources, LED-based and non-LED-based light sources alone or in combination, etc.) adapted to generate radiation of a variety of different colors may be employed in the lighting unit 10.

Lighting unit 10 may also include a controller 16 that is configured or programmed to output one or more signals to drive the light sources and generate varying intensities and/or colors of light from the light sources. For example, controller 16 may be programmed or configured to generate a control signal for each light source to independently control the intensity and/or color of light generated by each light source, to control groups of light sources, or to control all light sources together. According to another aspect, the controller 16 may control other dedicated circuitry such as light source driver 14 which in turn controls the light sources so as to vary their intensities. Controller 16 can be, for example, a microprocessor programmed using software to perform various functions discussed herein, and can be utilized in combination with a memory 18. The memory can store data, including one or more lighting commands or software programs for execution by the microprocessor, as well as various types of data including but not limited to specific identifiers for that lighting unit. Controller 16 can be programmed, structured and/or configured to cause light source driver 14 to regulate the intensity and/or color temperature of light source 12 based on predetermined data, such as ambient light conditions and the time of day, among others.

Lighting unit 10 also includes a source of power 20, most typically AC power, although other power sources are possible including DC power sources, solar-based power sources, or mechanical-based power sources, among others. The power source may be in operable communication with a power source converter that converts power received from an external power source to a form that is usable by the lighting unit. In order to provide power to the various components of lighting unit 10, it can also include an AC/DC converter (e.g., rectifying circuit) (not shown) that receives AC power from an external AC power source 20 and converts it into direct current for purposes of powering the light unit's components. The lighting unit can also include a switch 22 to activate and deactivate the lighting unit.

Figure 2:
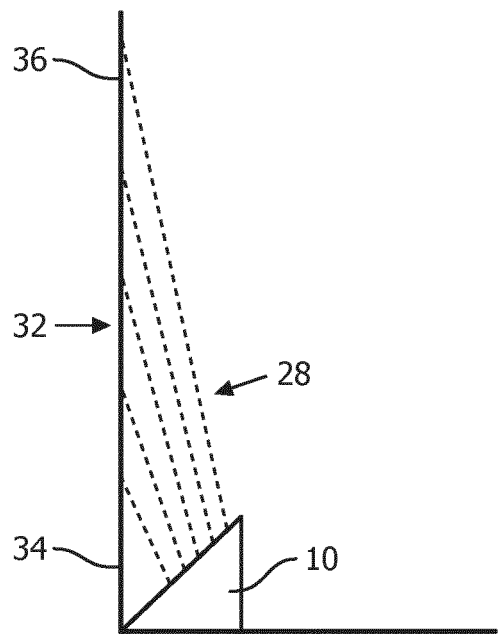
FIG. 2 is a side view schematic of a light source positioned at a close setback with a vertical surface in accordance with an embodiment.
Figure 3A:
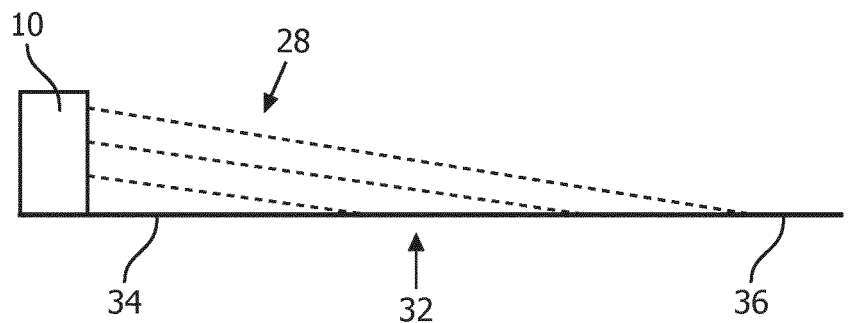
FIG. 3A is a side view schematic of a light source positioned at a close setback with a horizontal surface in accordance with an embodiment.
Figure 3B:
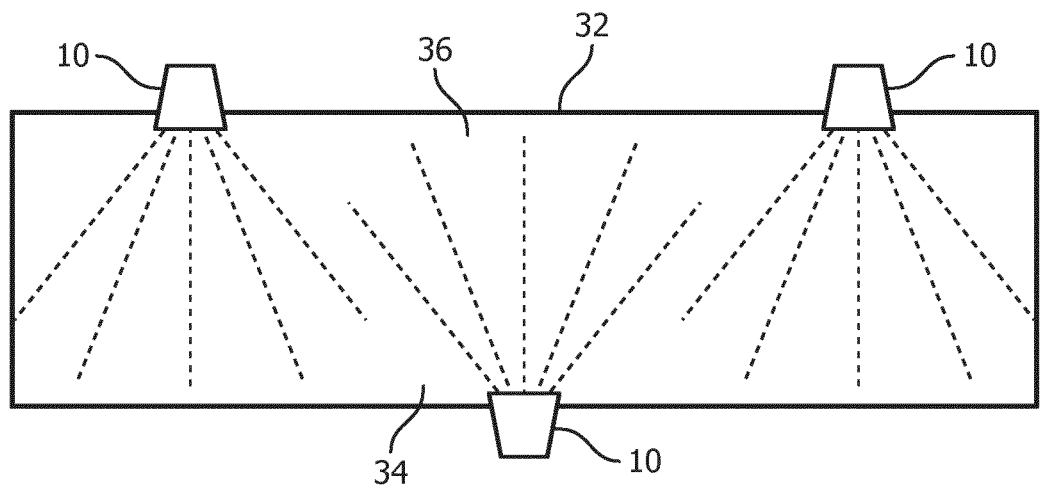
FIG. 3B is a top view schematic of a light source positioned at a close setback with a horizontal surface in accordance with an embodiment.

Referring to FIG. 2, in one embodiment, lighting unit 10 illuminates a vertical surface 32, such as a wall or exterior of a building, with a light beam 28. The vertical surface includes a proximal portion 34 and a distal portion 36. For one or more of a variety of reasons, including aesthetics and design limitations, the lighting unit is positioned close to the surface, at an angle to the surface, rather than pointing directly at the surface. This setback location requires that the lighting unit control the horizontal and vertical illumination beam pattern in order to provide a suitable illumination pattern on the surface. Similarly, in FIGS. 3A and 3B, lighting unit 10 illuminates a horizontal surface 32, such as a walkway, with a light beam 28. The horizontal surface includes a proximal portion 34 and a distal portion 36, defined by the location of each portion from the light source. For one or more of a variety of reasons, the lighting unit is positioned close, and perpendicular, to the surface rather than above the surface. This setback location requires that the lighting unit control the horizontal and vertical illumination beam pattern in order to provide a suitable illumination pattern on the surface. In particular, this location requires that the plurality of lighting units 10 such as those in FIG. 3B cooperate to create a uniform illumination pattern that includes overlapping regions between units.

Figure 4:
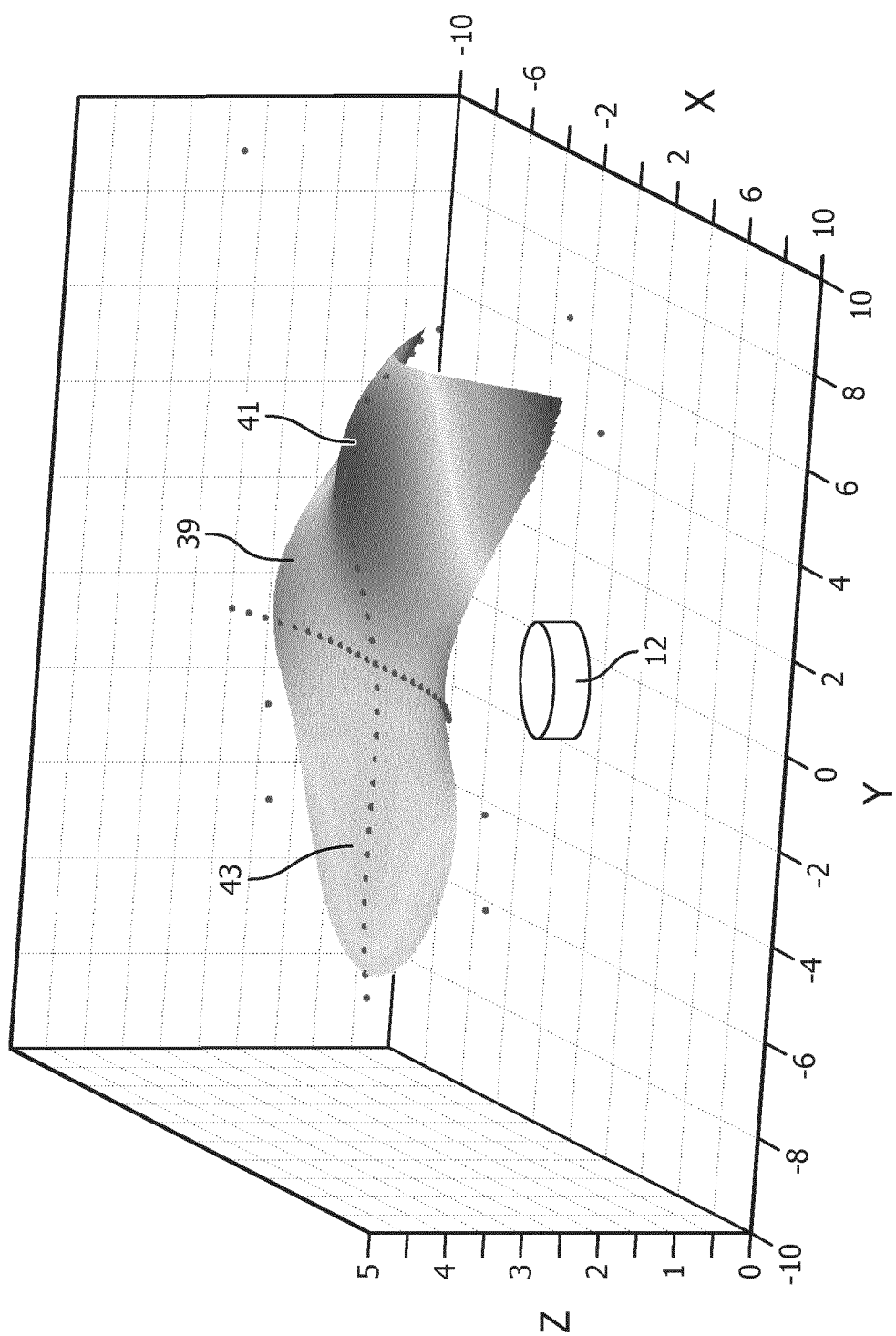
FIG. 4 is a schematic of the input surface of an optic in accordance with an embodiment.

Referring to FIG. 4, in one embodiment, an input surface 39 of optic 40 is provided that modifies the light beam emitted by the light source to create an illumination pattern on a surface. Below the input surface 39 are one or more light sources 12. According to an embodiment, the input surface 39 of optic 40 is configured to generate a predetermined illumination pattern on the surface. In this embodiment, input surface 39 includes one or more positive optical power regions 43, also called convex or converging lens regions. The convex lens portion 43 is configured to direct a portion of an emitted light beam 28 at a distant, or distal, portion of the surface. Input surface 39 also includes one or more negative optical power regions 41, also called concave or diverging lens regions. The concave lens portion 41 is configured to direct a portion of an emitted light beam 28 at a nearby, or proximal, portion of the surface.

Accordingly, the input surface 39 of optic 40 is a freeform surface that can be designed to modify the light beam emitted by the light source to create a specific illumination pattern on a surface. For example, the embodiment of input surface 39 of optic 40 in FIG. 4 has been designed to create a specific illumination pattern on a surface. According to yet another embodiment, as described in more detail below, a portion of optic 40, such as the input surface, is a Cartesian oval in order to create a specific illumination pattern on a surface. Optic 40 may have different entrance surface profiles and different exit surface profiles, allowing for a wide variety of embodiments and designs.

According to an embodiment, the adaptable input surface of optic 40 is configured to create a specific illumination pattern on a surface based on the location of the optical image 60 of the light source 12 in relation to the optic 40, not on the actual physical location of the light source 12 in relation to the optic 40. For example, an input surface 39 in the shape of a Cartesian oval will optically move the light source to another location, by creating an optical image 60 of the light source into a location different from the physical location of the light source. A Cartesian oval can, for example, create the optical image 60 of light source 12 at a variety of locations, including placing it at infinity, behind the physical light source, between the light source and the optic, and inside the optic. Based on the location of the optical image 60 of light source 12, the adaptable surface of optic 40 is then configured to create the specific illumination pattern on the surface.

According to an embodiment, software is utilized to design optic 40. Alternatively, the optic can be designed without the aid of a computer. If software is utilized, then an illuminance distribution for the surface can be generated. A user specifies the size and shape of the surface, as well as the sizes of the gradients around the edge of the illumination. The user can also control the beam cutoff and softness by adjusting the gradients at the top, bottom, and left and right edges. With that information, the software creates a table of illuminance data with the desired gradients from the center to the edge. According to an embodiment, each of the desired gradients is produced by a spline curve with well-chosen points. Once the illuminance data is generated, the information is used by optical design software to design the optic. The optical design software, which can be purchased or programmed, is utilized to design one or more freeform surfaces of the optic based on the prescribed illuminance and/or intensity distributions.

Figure 5A:
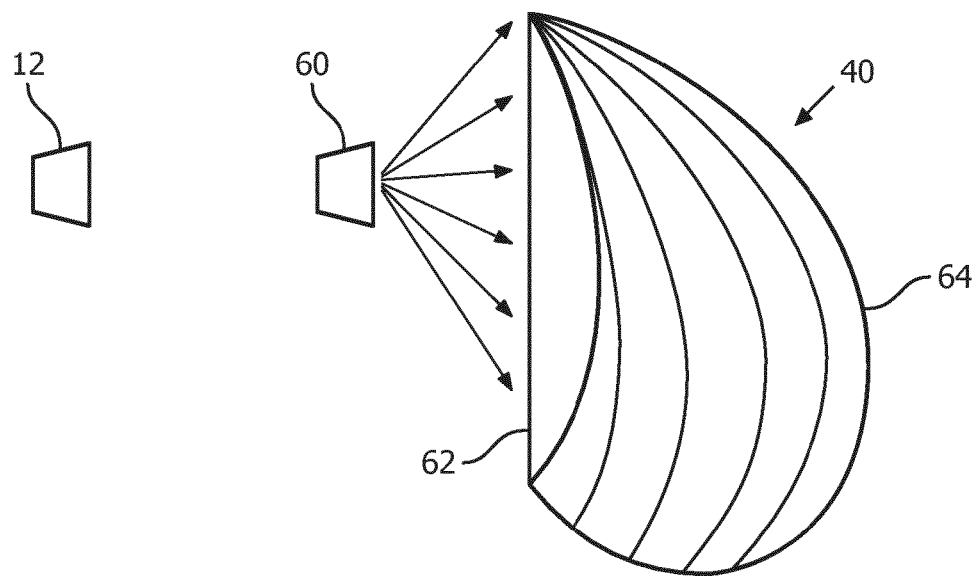
FIG. 5A is a schematic of a light source with an optic in accordance with an embodiment.
Figure 5B:
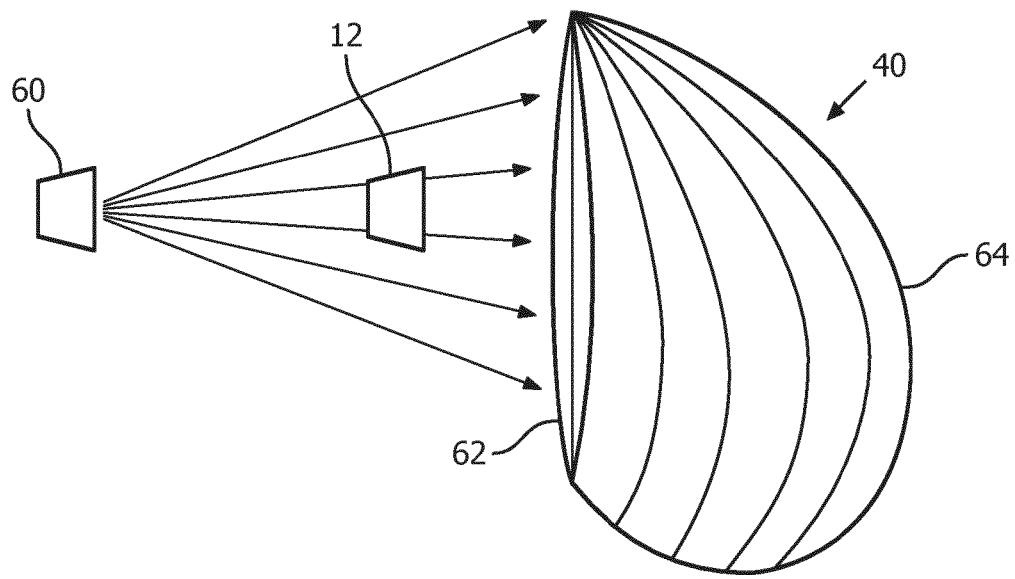
FIG. 5B is a schematic of a light source with an optic in accordance with an embodiment.

Referring to FIG. 5A, in one embodiment, a light source 12 and optic 40 is provided. In this embodiment, for example, the entrance surface profile 62 of optic 40 creates an optical image 60 of light source 12 that appears to be closer to the optic than it really is. Based on the position of this optical image 60, the exit surface 64 of the optic 40 can be designed to create the specific illumination pattern on the surface. Referring to FIG. 5B, in one embodiment, a light source 12 and optic 40 is provided. In this embodiment, for example, the entrance surface profile 62 of optic 40 creates an optical image 60 of light source 12 that appears to be further away from the optic than it really is. Based on the position of this optical image 60, the exit surface 64 of the optic 40 can be designed to create the specific illumination pattern on the surface.

Figure 6:
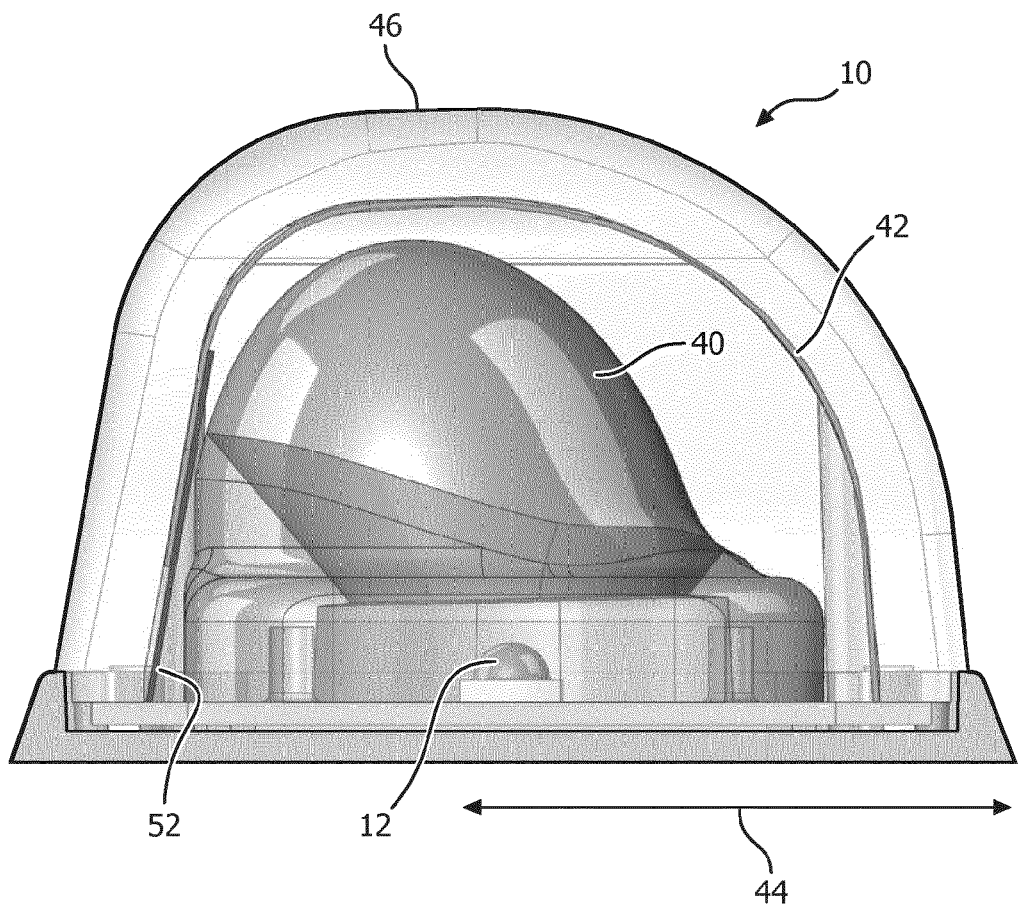
FIG. 6 is a schematic of a light source with an optic in accordance with an embodiment.

Referring to FIG. 6, in one embodiment, a lighting unit 10 is provided that includes one or more light sources 12, where one or more of the light sources may be an LED-based light source. Lighting unit 10 also includes an optic 40 that modifies the light beam emitted by the light source to create an illumination pattern on a surface. According to an embodiment, the optic is configured to generate a predetermined illumination pattern on the surface. Optic 40 is any of the embodiments described below or otherwise envisioned herein. Lighting unit 10 also includes an asymmetric diffuser 42 placed over the optic 40. According to an embodiment, asymmetric diffuser 42 is curved around the optic such that the light beam leaving the optic approaches the diffuser at an angle substantially perpendicular to the diffuser's surface. Designing the diffuser 42 to surround the optic and light source improves the light distribution because it allows the light beam to enter normal to the diffuser surface at a wider range of angles. This results in better control of the light and higher efficiency than the traditional approach of keeping the diffuser flat. According to an embodiment, the diffuser's profile is between 0 and 5 degrees in one direction along an axis denoted by 44 in FIG. 6, and between 10 and 40 degrees along an axis perpendicular to axis 44 (into and out of the figure). According to the embodiment depicted in FIG. 6, the assembly can be enclosed in a cover lens 46 with a profile that follows the curvature of the diffuser 42. Many other designs of cover lens 46 are possible, and in some embodiments there will be no cover lens.

As shown in FIG. 6, lighting unit 10 can also include a baffle 52 to block reddish light that can form at the edge of the light beam near the beam cutoff due to chromatic dispersion of a positive or converging lens. According to one embodiment, the baffle is positioned at a location between the light source and a surface to be illuminated. For example, the baffle may be placed at any point or location between the surface and the light source, such as on either side of a diffuser, cover, and/or optic. According to an embodiment, baffle 52 is a light blocker, a reflector, or a diffuser with a very wide diffusion angle. As just one example, baffle 52 can be a textured portion of the surface of the cover lens 46 rather than a separate component of the lighting unit or system.

Figure 7:
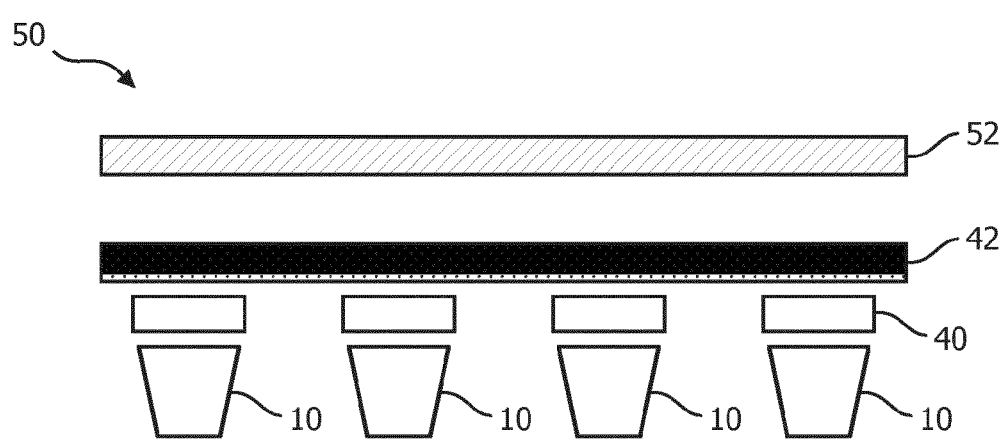
FIG. 7 is a schematic of a lighting system in accordance with an embodiment.

Referring to FIG. 7, in one embodiment, is a lighting system 50 with a plurality of lighting units 10 are provided that each includes one or more light sources 12, where one or more of the light sources may be an LED-based light source. Each lighting unit 10 also includes an optic 40 that modifies the light beam emitted by the light source to create an illumination pattern on a surface. According to an embodiment, the optic is configured to generate a predetermined illumination pattern on the surface. In this embodiment, lighting system 50 also includes a diffuser 42. Diffuser 42 may be an individual diffuser placed between each optic 40 and the surface, or it may be a flat sheet between two or more optics and the surface. Diffuser 42 may be an embodiment such as that described in FIG. 6, for example. Lighting system 50 can also include a baffle 52 positioned between the optics and a surface to be illuminated, in order to block reddish light that can form at the edge of the light beam near the beam cutoff.

According to an embodiment, therefore, lighting system 50 directs the emitted light beams in a controlled horizontal and vertical beam pattern with several advantages. For example, the edges of each light beam are controlled to allow for predetermined patterns resulting from the overlap of multiple beams. As another example, the light beam can be the same width at the top, or distal portion, and bottom, or proximal portion, of the beam. That is, the width of the light beam is larger at low vertical angles and narrower at high vertical angles, resulting in a controlled projection of the light beam.

This control of the light beam by optic 40 results in many applications. For example, the lighting unit or lighting system can be utilized to create a more uniform illumination profile over a surface from a close setback, such as a ceiling or wall, among many others. As another example, the lighting unit or lighting system can be utilized to create more 'natural' light distributions, since natural lighting often has a more even illumination profile. In settings such as exterior architecture where wall washing is desirable, the lighting units or lighting systems disclosed or otherwise envisioned herein can create a more uniform illumination profile from a closer setback than is otherwise possible. Where prior systems will require multiple lighting units or systems aimed at different locations, a single lighting unit or system as disclosed or otherwise envisioned herein will reduce system complexity while also offering a reduction in wasted light and vastly improving uniformity on the target surface. For path lighting, for example, the lighting units can be kept very low to the ground while illuminating large areas with high uniformity. A single lighting unit could be utilized to a highly uniform pattern of light 180 degrees around a fixture with virtually no wasted light. Yet another application could be billboards, in which the lighting unit or lighting system can be utilized to create a more uniform illumination profile over the billboard surface from a close setback. These and many other applications are possible.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The invention claimed is:

1. A lighting unit configured to illuminate a surface having a proximal portion and a distal portion in relation to the lighting unit, the lighting unit comprising:
   a light source configured to emit a light beam;
   an optic positioned between the light source and the surface, the optic configured to modify the emitted light beam to comprise a largely uniform illumination distribution along the surface, and comprising an input surface facing the light source, the input surface comprising: (i) a convex lens portion configured to direct a portion of the emitted light beam at the distal portion of the surface, and (ii) a concave lens portion configured to direct a portion of the emitted light beam at the proximal portion of the surface; and
   a diffuser positioned between the optic and the surface, wherein the diffuser is placed over the optic and at least partially contoured around the optic.

2. The lighting unit of claim 1, further comprising a baffle positioned between the optic and the surface.

3. The lighting unit of claim 1, wherein said light source is an LED-based light source.

4. The lighting unit of claim 1, wherein said lighting unit comprises a plurality of light sources.

5. The lighting unit of claim 1, wherein said emitted light beam comprises a substantially uniform illumination distribution along the length of said surface.

6. A lighting system comprising:
   a plurality of lighting units of claims 1; and
   a baffle positioned between the optic and the surface.

7. The lighting system of claim 6, wherein said light source is an LED-based light source.

8. The lighting system of claim 6 wherein said lighting system comprises a plurality of light sources.

9. The lighting system of claim 6, wherein said emitted light beam comprises a substantially uniform illumination distribution along the length of said surface.

10. The lighting system of claim 6, further comprising a cover lens.

11. The lighting system of claim 10, wherein the baffle is a textured portion of the cover lens.

12. The lighting system of claim 1,
    wherein the light source comprises a plurality of LED-based light sources each configured to emit a light beam.

13. The lighting unit of claim 1, wherein the diffuser is curved around the optic such that the light beam leaving the optic approaches the diffuser at an angle substantially perpendicular to the diffuser's surface.

14. The lighting unit of claim 13, further comprising a cover lens following the curvature of the diffuser.

15. The lighting unit of claim 1, wherein the baffle is a textured portion of the surface of the cover lens.

* * * * *